United States Patent [19]

Rowe et al.

[11] 4,235,693

[45] Nov. 25, 1980

[54] SUBMERSIBLE ENERGY STORAGE APPARATUS

[75] Inventors: Raymond A. Rowe, Encinitas; Joseph F. McCartney, Solana Beach, both of Calif.

[73] Assignee: The United States of America as represented by the Secretary of the Navy, Washington, D.C.

[21] Appl. No.: 92,819

[22] Filed: Nov. 9, 1979

[51] Int. Cl.³ .................. C25B 15/08; C25B 1/02; C25B 9/00
[52] U.S. Cl. ........................ 204/229; 204/129; 204/277; 204/278; 204/DIG. 4
[58] Field of Search ......... 204/DIG. 4, 129, 275–278, 204/229

[56] References Cited

U.S. PATENT DOCUMENTS

| | | | |
|---|---|---|---|
| 2,728,121 | 12/1955 | Goument | 204/278 X |
| 3,652,431 | 3/1972 | Reynolds | 204/129 |
| 3,957,618 | 5/1976 | Spirig | 204/229 X |

FOREIGN PATENT DOCUMENTS

| | | | |
|---|---|---|---|
| 50-22947 | 3/1975 | Japan | 204/129 |
| 51-18983 | 2/1976 | Japan | 204/129 |

*Primary Examiner*—Howard S. Williams
*Assistant Examiner*—D. R. Valentine

*Attorney, Agent, or Firm*—Richard S. Sciascia; Ervin F. Johnston

[57] ABSTRACT

A submersible energy storage apparatus for an electrical power source is provided which includes an electrolysis unit feed water gas collection assembly and a fuel cell. The electrolysis unit feed water gas collection assembly includes a hydrogen container and an oxygen container wherein each container has a gas outlet and is capable of containing feed water as well as hydrogen and oxygen gases respectively. An electrolysis cell is provided which has a hydrogen outlet, an oxygen outlet and a feed water inlet. The hydrogen outlet is located in the hydrogen container, the oxygen outlet is located in the oxygen container, and the feed water inlet is located in one of the containers. Each of the containers has an opening to the submersible environment so as to be pressure responsive thereto. A barrier device is provided in association with the opening in each container for isolating the feed water in the container from water in the submersible environment. The fuel cell is operatively connected to the hydrogen and oxygen containers, and the electrical power source is operatively connected to the electrolysis cell. With this arrangement the electrolysis cell is capable of utilizing power from the power source during low electrical energy demand, and the fuel cell is capable of utilizing the hydrogen and oxygen gases for generating electricity during high demand periods.

17 Claims, 7 Drawing Figures

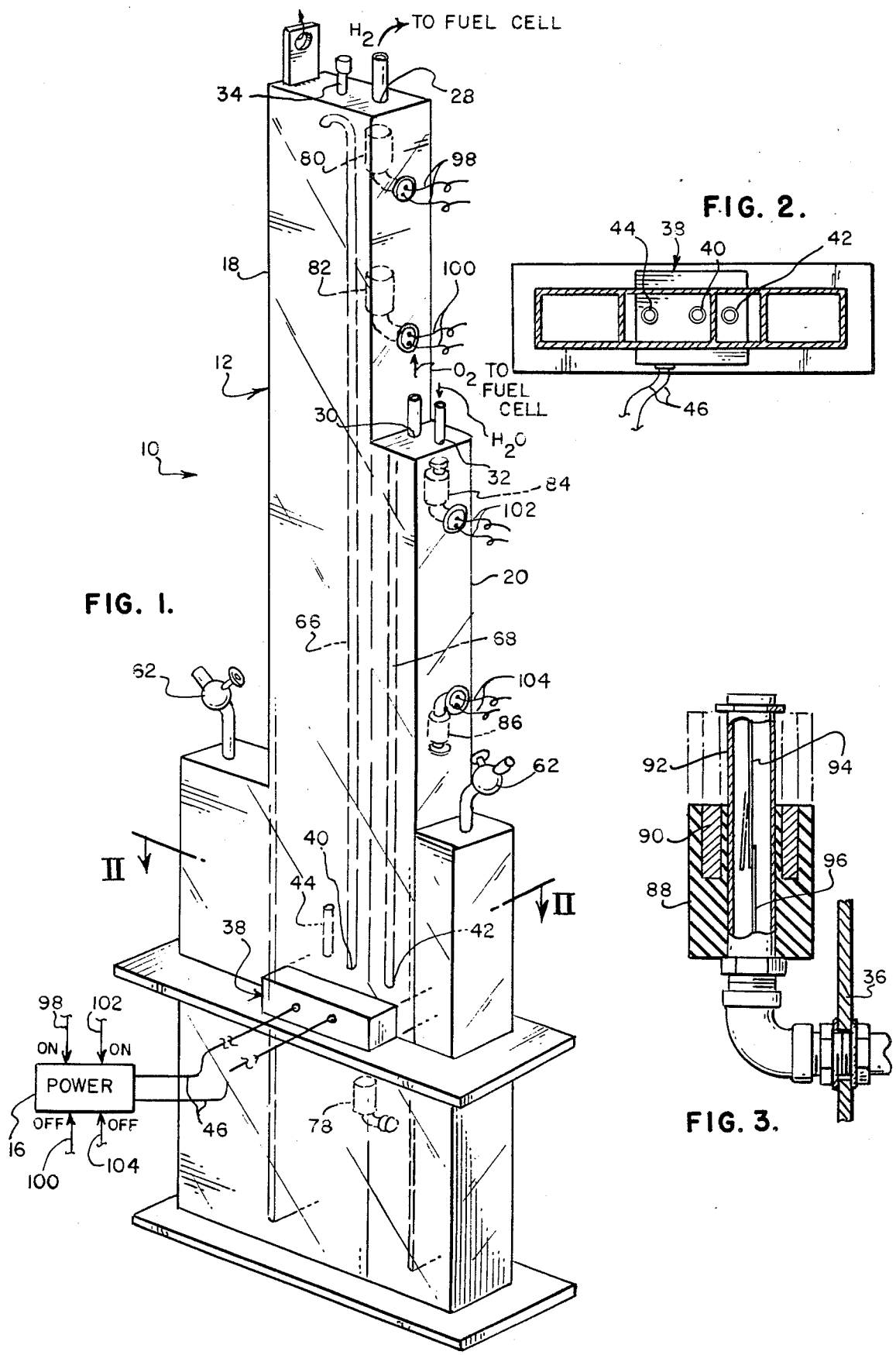

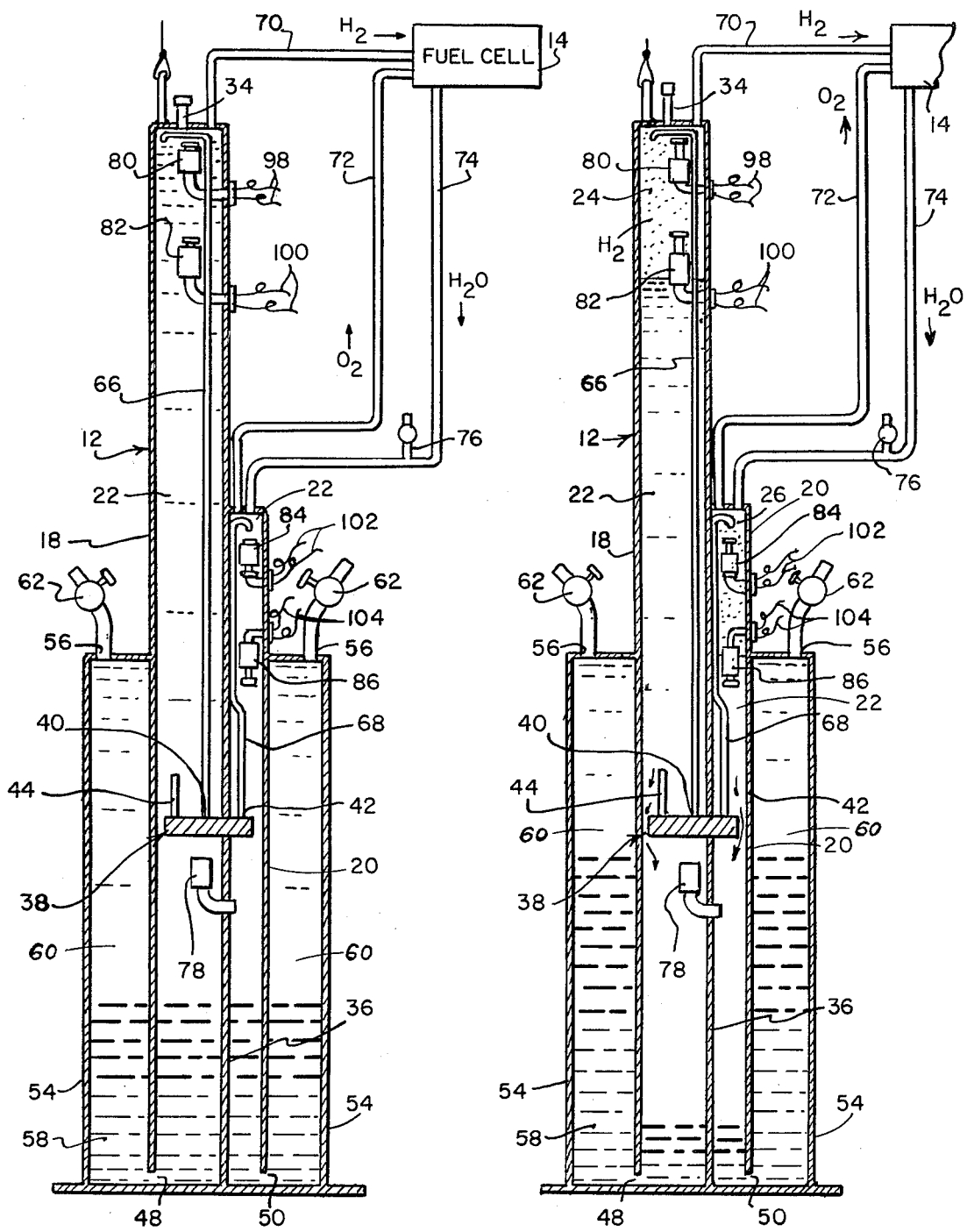

SUBMERSIBLE ENERGY STORAGE APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Most oceanographic equipment operates in two modes, namely: a power requirement mode and a no power requirement mode. Examples of such oceanographic equipment are transmitters, processors, light beacons, and some oceanographic instruments. Some equipment is left for prolonged periods in remote locations. In these instances the power source must be on site. A typical power source is batteries. However, batteries require periodic replacement or charging. In order to leave the oceanographic equipment unattended for long periods of time attempts have been made to provide energy from natural sources, such as solar cells or wave action, however, the energy available from these sources is normally intermittent. There has been a need for an energy device which will store intermittently generated energy so that power will be available to oceanographic equipment on a demand basis. Also, the amount of power produced by solar cells or wave action is sometimes not sufficient to operate the remote equipment. There is a need for an energy storage device which will receive small power inputs and then subsequently deliver a higher power output to operate the equipment.

Presently, there is much interest in the storage of energy from power generating utility plants during low demand periods such as at night for supplying generated as well as stored power during high demand periods. Most utility plants near a body of water, such as at advanced navy bases or near lakes or rivers, are not being utilized to their full potential since they are virtually dormant during the nighttime. Again, a practical device of storing the energy from utility plants during low demand periods is needed.

SUMMARY OF THE INVENTION

The present invention provides an energy storage apparatus which is submersible, such as in ocean water, for storing small amounts of energy to supply a larger capacity when demanded. This has been accomplished by providing an electrolysis unit feed water gas collection assembly in combination with a fuel cell. The electrolysis unit feed water gas collection assembly contains a hydrogen container and an oxygen container wherein each container has a gas outlet and is capable of containing feed water as well as hydrogen and oxygen gases respectively. An electrolysis cell is provided which has a hydrogen outlet, an oxygen outlet, and a feed water inlet. The hydrogen outlet is located in the hydrogen container, the oxygen outlet is located in the oxygen container, and the feed water inlet is located in one of the containers. Each of the containers has an opening to the submersible ambient environment so as to be pressure responsive thereto. A barrier device is operably associated with the opening in each container for isolating feed water in the container from water in the submersible environment. The fuel cell is operably connected to the hydrogen and oxygen containers, and the electrical power source is operably connected to the electrolysis cell. With this arrangement power can be stored from utility plants during low demand periods to meet the power needs during high demand periods. Also, the invention will store power from intermittent low power generators to supply power on a continuous basis to user equipment.

OBJECTS OF THE INVENTION

An object of the present invention is to provide an energy storage apparatus.

Another object is to provide an energy storage apparatus which is operable in a water submerged environment.

Another object is to provide an ocean submersible energy storage apparatus which is capable of storing smaller amounts of energy for meeting a larger energy demand at a subsequent time.

Yet another object is to provide an electrolysis unit feed water gas collection assembly for a submersible energy storage apparatus.

These and other objects of the invention will become more readily apparent from the ensuing specification when taken together with the drawings.

BRIEF DESCRIPTION OF THE DRAWINGS

FIG. 1 is an isometric view of the electrolysis unit feed water gas collection assembly and power source therefor.

FIG. 2 is a cross sectional view taken along plane II—II of FIG. 1.

FIG. 3 is an elevational view, partly in cross section, of a float reed switch utilized in the electrolysis feed water gas collection assembly unit.

FIG. 4 is an elevational cross sectional view of the electrolysis unit feed water gas collection assembly and the fuel cell in a water filled mode.

FIG. 5 is similar to FIG. 4 except the electrolysis unit feed water gas collection assembly and the fuel cell is in a gas stored mode.

DESCRIPTION OF THE PREFERRED EMBODIMENTS

Figure 6:
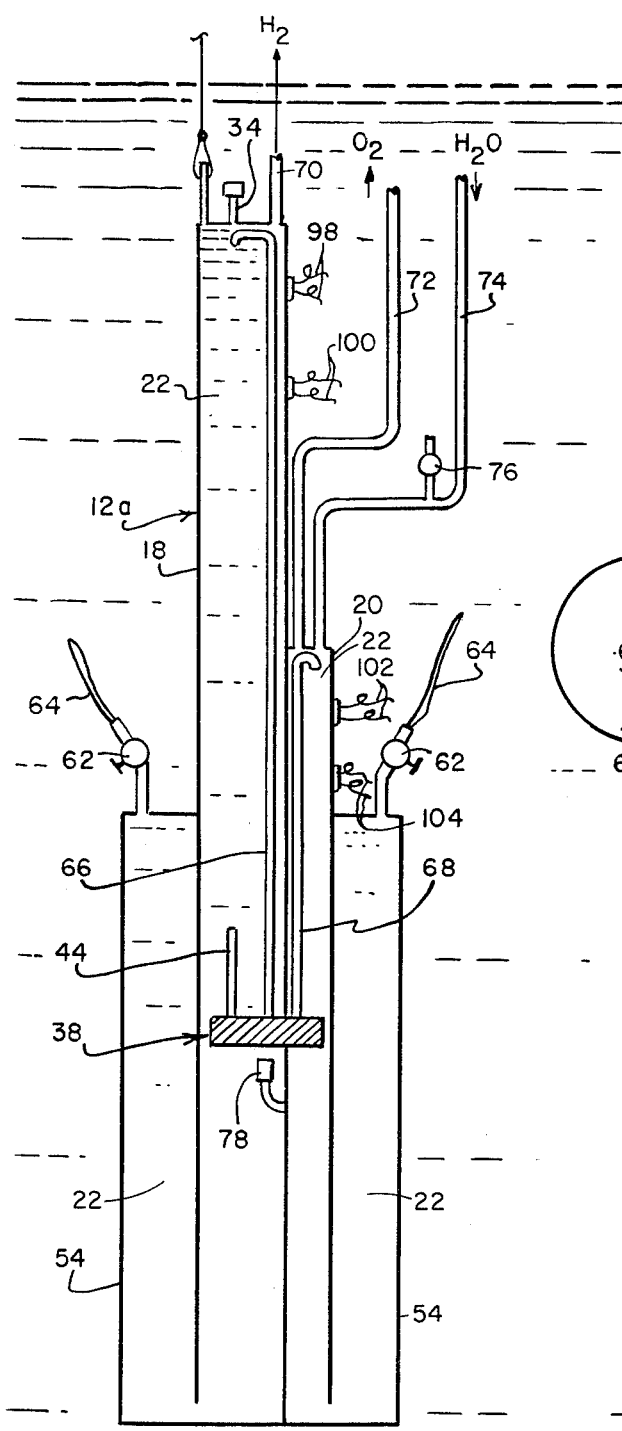
FIG. 6 is a modified form of the electrolysis unit feed water gas collection assembly in an inactive mode.

Referring now to the drawings wherein like reference numerals designate like or similar parts throughout the several views there is illustrated in FIG. 1 a submersible energy storage apparatus 10 which includes an electrolysis unit feed water gas collection assembly 12, and a fuel cell 14 (see FIG. 4), which can be used to store power from a power source 16. As illustrated in FIGS. 1, 4 and 5 the electrolysis unit feed water gas collection assembly may include a hydrogen container 18, and an oxygen container 20. Each container is capable of containing feed water 22 as well as hydrogen and oxygen gases 24 and 26 respectively. The containers are preferably upstanding with the hydrogen container 18 being higher than the oxygen container 20 for a purpose to be explained hereinbelow. The top portions of the containers 18 and 20 may be provided with hydrogen and oxygen gas outlets 28 and 30 respectively. The oxygen container may be provided with a feed water inlet 32 at its top end, and the top end of the hydrogen container 18 may be provided with a feed water inlet tube 34 which may be sealed with a screw cap after the containers are completely filled with feed water. As illustrated in FIGS. 1, 4 and 5, the containers 18 and 20 may be rectangular in cross section and may be provided with a common wall 36.

An electrolysis unit 38, which may include one or more electrolysis cells, may be provided which has a hydrogen outlet 40, and oxygen outlet 42, and a water inlet conduit 44. The hydrogen outlet 40 is located in the hydrogen container 18, the oxygen outlet 42 is located in the oxygen container 20, and the feed water inlet 44 may be located within the hydrogen container 18. The electrolysis unit 38, which may be rectangular in shape, may sealably extend through and between the hydrogen and oxygen containers 18 and 20, as illustrated in FIG. 1 so that the gas outlets and feed water inlet are located as described hereinabove. Further, the electrolysis unit 38 is hermetically sealed except for its designed openings. A suitable electrolysis unit is the $H_2$ Gen model 15EHG 1B1 made by General Electric. The electrical power source 16 is connected to the electrolysis unit 38 by leads 46. The electrical power source may be of very small output capacity such as a solar cell or wave generator floating on the surface of the water.

Each of the containers 18 and 20 has a respective opening 48 and 50 to the submersible ambient environment so as to be pressure responsive thereto. Barrier means, which will be described in detail hereinafter, are operatively associated with the openings 48 and 50 in the containers for isolating the feed water in the containers from water in the submersible environment.

The barrier means may include upstanding tanks 54 with the hydrogen and oxygen containers 18 and 20 extending downwardly therein. The bottom portions of both of the containers 18 and 20 may be in communication with the bottom portion of tanks 54 by any suitable means such as the openings 48 and 50. The upstanding tanks 54 may also be rectangular in cross section with the containers 18 and 20 sealably extending therein. The top of the tank may be provided with two openings 56 to the submersible environment which is sea water when the apparatus is submerged in the ocean.

In the embodiment illustrated in FIGS. 4 and 5 the barrier means further includes a barrier liquid 58 which isolates the feed water 22 in the containers 18 and 20 from the sea water 60 in the tanks 54. In order to accomplish this isolation the barrier fluid may be heavier than water. A suitable barrier liquid has been found to be "fluorolube". The level of the barrier liquid is well below the electrolysis unit 38 when the electrolysis unit feed water gas collection assembly 12 is filled with water, as illustrated in FIG. 4, and is even further below the electrolysis unit 38 in the gas storage mode, as illustrated in FIG. 5. Valves 62 may be provided for opening and closing the tank openings 56, these valves being in the open mode when the storage apparatus is in operation.

Figure 7:
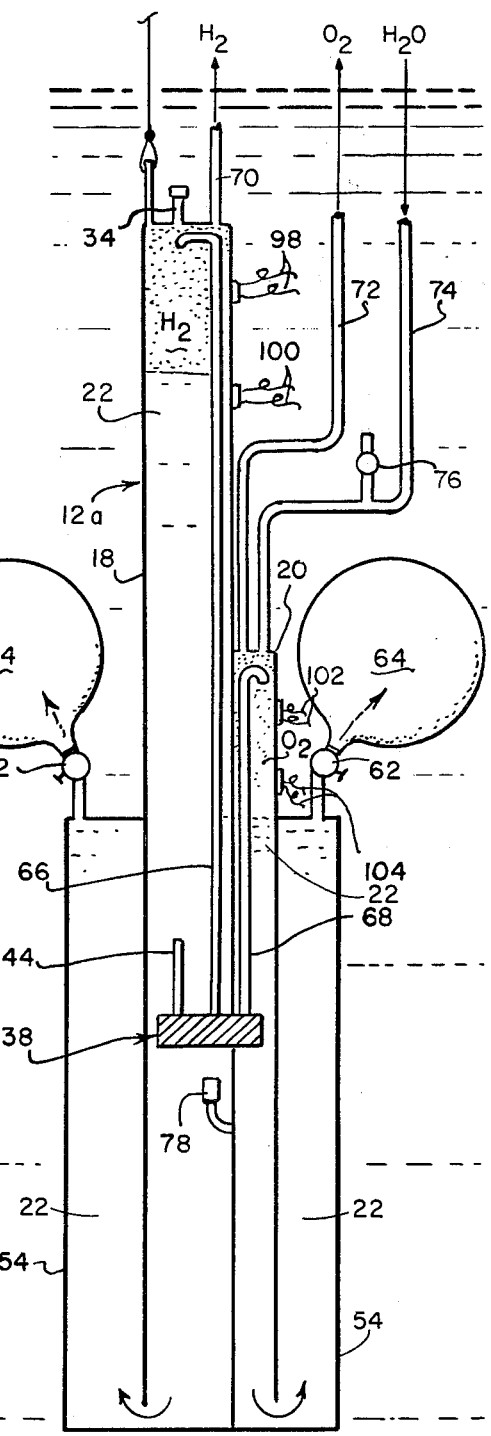
FIG. 7 is the modified electrolysis unit feed water gas collection assembly in an active mode.

Another embodiment of the electrolysis unit feed water gas collection assembly 12a is illustrated in FIGS. 6 and 7. In this embodiment the hydrogen and oxygen containers 18 and 20 and the tanks 54 are initially completely filled with feed water 22. Further, the outlets of the valves 62 are sealed with balloon type bladders 64. In the water filled mode the bladders 64 are in a deflated condition, while in a gas storage mode the bladders 64 are inflated as illustrated in FIG. 7.

In either embodiment when the electrolysis unit 38 is operated hydrogen gas will collect in the top of the hydrogen container 18 and oxygen gas will collect in the top of the oxygen container 20. In order to prevent absorption of these gases in the feed water a hydrogen conduit 66 may be connected to the hydrogen gas outlet of the electrolysis unit and may extend upwardly into a top portion of the hydrogen container 18. In like manner an oxygen conduit 68 may be connected to the oxygen outlet 42 of the electrolysis unit and may extend upwardly into a top portion of the oxygen container 20. The hydrogen and oxygen gases are then delivered to the fuel cell via hydrogen and oxygen conduits 70 and 72. Feed water generated by the fuel cell is then returned to the top of the oxygen container 20 via a conduit 74. The feed water conduit 74 may be provided with a valve 76 intermediate in the line for initial feed water filling purposes.

Below the electrolysis unit 38 a check valve 78 may be provided in the common wall 36 between the containers with the one way direction flow being from the oxygen container 20 to the hydrogen container 18. It is important that the feed water return to the oxygen container 20, that thence the feed water be appropriately fed through the valve 78 to the hydrogen container 18, and that the hydrogen container 18 be higher than the oxygen container 20. The purpose of this arrangment is to prevent hydrogen gas from entering the fuel cell through the oxygen line 72. Such an occurrence would most likely ruin the fuel cell. With the aforementioned arrangement the oxygen gas pressure within the container 20 is greater than the hydrogen gas pressure within the container 18 when the electrolysis unit feed water gas collection assembly is turned off by switches which will be described hereinbelow.

Pairs of switches 80 and 82, and 84 and 86 are preferably mounted in top portions of the respective containers 18 and 20 for switching the power source 16 on when feed water has risen to a predetermined level at either of the top switches 80 or 82 and switching the power source off when the feed water level has dropped to a lower level at either of the lower switches 82 or 86. Float reed switches, one of which is illustrated in detail in FIG. 3, may be utilized for accomplishing the switching functions. The reed switch may include a float 88 with a magnet 90 which are slidable on a sealed tube 92. A pair of reeds 94 and 96, which are connected to the wires of the switch, are normally biased apart in an open circuit condition until the magnet 90 is in juxtaposition to the reeds to effect a closed circuit condition. As illustrated in FIG. 1, wires 98 and 102 from the float switches 80 and 84 respectively are connected to the power source 16 for turning the power source on when the feed water has risen to a predetermined level. Likewise, wires 100 and 104 from the float switches 82 and 86 respectively are also connected to the power source 16 for turning the power source off when the feed water level has dropped a predetermined amount in either of the containers 18 or 20.

OPERATION OF THE INVENTION

In preparing the embodiment in FIGS. 1, 4 and 5 for operation the valves 62 may be opened and the bottom portions of the tanks 54, container 18, and container 20 may be filled with the barrier fluid such as "Fluorolube" 58 to a predetermined level below the electrolysis cell 38. The conduit 34 and the valve 76 may be opened to fill the hydrogen container 18 and the oxygen container 20 with distilled water to serve as feed water for the electrolysis unit 38. Sea water or fresh water may be introduced into the top portion of the tanks 54 through valves 62. During transportation the entire assembly is kept in an upright position with all of the valves closed as well as the conduit 34.

When the apparatus in FIGS. 1, 4 and 5 is at the site of operation, it is lowered into the water to a predetermined depth with the valves 62 in an open condition. The apparatus will then operate to generate hydrogen and oxygen gases in the top portions of the containers 18 and 20 respectively until the bottom floats 82 and 86 are activated to turn off the power source means 16. These hydrogen and oxygen gases are utilized by the fuel cell when there is an energy demand upon the fuel cell, at which time the fresh water is returned from the fuel cell via conduit 74 to the oxygen container 20. Feed water is balanced with the hydrogen container 18 through the check valve 78, and the levels of feed water within the containers 18 and 20 continue to rise until either one of the float switches 80 or 84 is activated. When this occurs, the power source 16 is turned on to once again generate gases in the top of the containers 18 and 20.

In the preparation of the embodiment illustrated in FIGS. 6 and 7 the entire apparatus including the containers 18 and 20, and the tanks 54 are completely filled with distilled water through the conduit 34 and the valves 76 and 62. Empty bladders 64 are then attached to valves 62. All valves are kept in a closed position until the apparatus is submerged in the water, at which time the valves 62 are opened. The embodiment illustrated in FIGS. 6 and 7 operates in the same manner as the embodiment in FIGS. 4 and 5 except when gases are generated in the containers 18 and 20 the bladders 64 expand, as illustrated in FIG. 7, to store the displaced feed water.

Obviously, many modifications and variations of the present invention are possible in the light of the above teachings, and, it is therefore understood that within the scope of the disclosed inventive concept, the invention may be practiced otherwise than specifically described.

What is claimed is:

1. An electrolysis unit feed water gas collection assembly for a water submersible energy storage apparatus wherein the energy storage apparatus includes the collection assembly as well as a fuel cell, comprising:
   a hydrogen container and an oxygen container, each container having a gas outlet and being capable of containing feed water as well as hydrogen and oxygen gases respectively;
   an electrolysis unit having a hydrogen outlet, an oxygen outlet, and a feed water inlet, the hydrogen outlet being located in the hydrogen container, the oxygen outlet being located in the oxygen container, and the feed water inlet being located in one of the containers;
   each of said containers having an opening to the submersible ambient environment so as to be pressure responsive thereto; and
   barrier means operatively associated with the opening in each container for isolating the feed water in the containers from water in the submersible environment.

2. An electrolysis unit feed water gas collection assembly as claimed in claim 1 including:
   switch means mounted within at least one of the containers for switching a power source on when feed water has risen to a predetermined level in the container and switching the power source off when the feed water level has dropped a predetermined amount.

3. An electrolysis unit feed water gas collection assembly as claimed in claim 1 including:
   said container being upstanding with the hydrogen container being higher than the oxygen container.

4. An electrolysis unit feed water gas collection assembly as claimed in claim 3 including:
   a feed water check valve interconnecting the oxygen container to the hydrogen container with the direction of flow toward the hydrogen container.

5. An electrolysis unit feed water gas collection assembly as claimed in claim 1 wherein the barrier means includes:
   upstanding tanks;
   the hydrogen and oxygen containers extending into the tanks with the bottom portions of both containers being in communication with the bottom portions of the tanks; and
   the tanks each having an opening to the submersible environment.

6. An electrolysis unit feed water gas collection assembly as claimed in claim 5 wherein:
   the fluid barrier means includes a liquid which is heavier than water, the liquid being located with the bottom portions of the containers and the tanks.

7. An electrolysis unit feed water gas collection assembly as claimed in claim 5 wherein:
   the barrier means includes a bladder which is mounted across the tank opening.

8. An electrolysis unit feed water gas collection assembly as claimed in claim 7 including:
   switch means mounted within at least one of the containers for switching a power source on when feed water has risen to a predetermined level in the container and switching the power source off when the feed water level as dropped a predetermined amount.

9. An electrolysis unit feed water gas collection assembly as claimed in claim 8 including:
   said container being upstanding with the hydrogen container being higher than the oxygen container.

10. An electrolysis unit feed water gas collection assembly as claimed in claim 9 including:
    a feed water check valve interconnecting the oxygen container to the hydrogen container with the direction of flow toward the hydrogen container.

11. A submersible energy storage apparatus for storing energy from an electrical power source comprising:
    an electrolysis unit feed water gas collection assembly which includes:
      a hydrogen container and an oxygen container, each container having a gas outlet and being capable of containing feed water as well as hydrogen and oxygen gases respectively;
      an electrolysis unit having a hydrogen outlet, an oxygen outlet, and a feed water inlet, the hydrogen outlet being located in the hydrogen container, the oxygen outlet being located in the oxygen container, and the feed water inlet being located in one of the containers;
      each of said containers having an opening to the submersible ambient environment so as to be pressure responsive thereto;
      barrier means operatively associated with the opening in each container for isolating the feed water in the containers from water in the submersible environment; and a fuel cell operatively connected to the hydrogen and oxygen containers.

12. A submersible energy storage apparatus as claimed in claim 11 including:
the gas outlet of each container being in the top of the respective container and the top of the oxygen container having a water inlet;
a plurality of conduits connecting the gas outlets and the water inlet of the containers to the fuel cell; and
a conduit connected to each respective hydrogen and oxygen outlet of the electrolysis unit feed water gas collection assembly and extending upwardly to a top portion of each respective container.

13. A submersible energy storage apparatus as claimed in claim 12 including:
switch means located within each container above the feed water inlet of the electrolysis unit feed water gas collection assembly for switching the power source on when the feed water in the respective container has risen to a predetermined level in the respective container and for switching the power source off when the feed water level has dropped a predetermined amount.

14. A submersible storage apparatus as claimed in claim 13 including:
said containers being upstanding with the hydrogen container being higher than the oxygen container; and
a feed water check valve interconnecting the oxygen container to the hydrogen container at a location below the feed water inlet of the electrolysis unit feed water gas collection assembly with the direction of flow toward the hydrogen container.

15. A submersible storage apparatus as claimed in claim 14 including:
an upstanding tank;
the hydrogen and oxygen containers extending into the tanks with the bottom portions of both containers being in communication with the bottom portion of the tanks; and
the tanks each having an opening to the submersible environment.

16. A submersible storage apparatus as claimed in claim 15 including:
the barrier means includes a liquid which is heavier than water, the liquid being located with the bottom portions of the containers and the tank.

17. A submersible storage apparatus as claimed in claim 15 including:
the barrier means includes a bladder which is mounted across the tank opening.

* * * * *

UNITED STATES PATENT AND TRADEMARK OFFICE
CERTIFICATE OF CORRECTION

PATENT NO. : 4,235,693
DATED : November 25, 1980
INVENTOR(S) : Raymond A. Rowe and Joseph F. McCartney It is certified that error appears in the above-identified patent and that said Letters Patent is hereby corrected as shown below:

Column 4, line 37, change "82" to -- 84 --.

Column 4, line 64, change "conduit" to -- tube --.

Column 5, line 3, change "conduit" to -- tube --.

Signed and Sealed this

Twelfth Day of May 1981

[SEAL]

Attest:

RENE D. TEGTMEYER

Attesting Officer   Acting Commissioner of Patents and Trademarks